United States Patent
Heikkinen et al.

(10) Patent No.: US 11,601,388 B2
(45) Date of Patent: Mar. 7, 2023

(54) MEDIA REQUEST SYSTEM

(71) Applicant: Snap Inc., Santa Monica, CA (US)

(72) Inventors: Christie Marie Heikkinen, Santa Monica, CA (US); Celia Nicole Mourkogiannis, Los Angeles, CA (US); David Phillip Taitz, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 30 days.

(21) Appl. No.: 16/885,007

(22) Filed: May 27, 2020

(65) Prior Publication Data
US 2021/0377200 A1    Dec. 2, 2021

(51) Int. Cl.
| | | |
|---|---|---|
| *H04L 51/18* | (2022.01) | |
| *H04L 51/10* | (2022.01) | |
| *G06F 3/04845* | (2022.01) | |
| *G06F 3/04817* | (2022.01) | |
| *H04L 51/52* | (2022.01) | |
| *H04L 51/224* | (2022.01) | |
| *H04L 51/226* | (2022.01) | |

(52) U.S. Cl.
CPC .......... *H04L 51/18* (2013.01); *G06F 3/04817* (2013.01); *G06F 3/04845* (2013.01); *H04L 51/10* (2013.01); *H04L 51/224* (2022.05); *H04L 51/226* (2022.05); *H04L 51/52* (2022.05)

(58) Field of Classification Search
CPC ......... H04L 51/18; H04L 51/10; H04L 51/24; H04L 51/26; H04L 51/32; G06F 3/04817; G06F 3/04845
See application file for complete search history.

(56) References Cited

U.S. PATENT DOCUMENTS 7,636,898 B2 * 12/2009 Takahashi ........... G06F 3/04817
  715/769
9,456,010 B1 * 9/2016 Abraham .............. H04M 3/564
  (Continued)

FOREIGN PATENT DOCUMENTS

KR      20150080631 A    7/2015
WO   WO-2021242820 A1   12/2021

OTHER PUBLICATIONS

Christina Newberry, How to Use Snapchat: A Guide for Beginners, Jan. 9, 2018 (Year: 2018).*

(Continued)

*Primary Examiner* — Ninos Donabed
(74) *Attorney, Agent, or Firm* — Schwegman Lundberg & Woessner, P.A.

(57) ABSTRACT

A media request system to perform operations that include: receiving, at a client device, a response to a request, the response comprising media content; adding the media content from the response to a collection of media content within a media folder associated with the request at the client device; causing display of a notification at the client device in response to the receiving the response to the request, the notification including an identification of the request; receiving an input that selects the notification; and causing display of a presentation of the collection of media content in response to the input that selects the notification, the presentation of the collection of media content including the media content from the response, according to certain example embodiments.

14 Claims, 12 Drawing Sheets

(56) References Cited

U.S. PATENT DOCUMENTS

| | | | | |
|---|---|---|---|---|
| 9,870,802 B2* | 1/2018 | Carson | | H04N 21/472 |
| 10,242,477 B1* | 3/2019 | Charlton | | H04L 67/306 |
| 10,270,839 B2* | 4/2019 | Andreou | | H04L 51/10 |
| 10,609,036 B1* | 3/2020 | Allen | | H04L 67/26 |
| 10,885,564 B1* | 1/2021 | Jayaram | | G06Q 30/0643 |
| 2007/0198648 A1* | 8/2007 | Allen | | G06Q 10/109 |
| | | | | 709/207 |
| 2009/0048845 A1* | 2/2009 | Burckart | | G10L 15/26 |
| | | | | 709/206 |
| 2009/0271716 A1* | 10/2009 | Jones | | G06Q 10/109 |
| | | | | 715/758 |
| 2010/0077029 A1* | 3/2010 | Shook | | H04L 12/1831 |
| | | | | 709/204 |
| 2010/0138502 A1* | 6/2010 | Miller | | G06F 9/543 |
| | | | | 709/206 |
| 2010/0262928 A1* | 10/2010 | Abbott | | H04M 1/72436 |
| | | | | 715/769 |
| 2011/0252346 A1* | 10/2011 | Chaudhri | | G06F 3/04812 |
| | | | | 715/765 |
| 2012/0042272 A1* | 2/2012 | Hong | | G06F 3/0486 |
| | | | | 715/769 |
| 2013/0132878 A1* | 5/2013 | Tijssen | | G06F 3/0488 |
| | | | | 715/769 |
| 2014/0022192 A1* | 1/2014 | Hatanaka | | H04N 21/42204 |
| | | | | 345/173 |
| 2014/0195562 A1* | 7/2014 | Hardeniya | | G06Q 30/0256 |
| | | | | 707/776 |
| 2014/0351340 A1* | 11/2014 | Houston | | H04L 67/10 |
| | | | | 709/204 |
| 2015/0324825 A1* | 11/2015 | McLean | | G06Q 30/0204 |
| | | | | 705/7.31 |
| 2016/0027096 A1* | 1/2016 | Li | | G06Q 30/0277 |
| | | | | 705/26.81 |
| 2016/0212207 A1* | 7/2016 | Guo | | H04L 67/01 |
| 2016/0241501 A1* | 8/2016 | Liu | | G06F 40/12 |
| 2016/0283745 A1* | 9/2016 | LaFever | | G06F 21/6254 |
| 2016/0328678 A1* | 11/2016 | Gillen | | G06Q 10/0838 |
| 2017/0034085 A1* | 2/2017 | Bijor | | H04L 51/16 |
| 2017/0161382 A1* | 6/2017 | Ouimet | | G11B 27/34 |
| 2017/0243028 A1* | 8/2017 | LaFever | | G06F 21/6263 |
| 2018/0025219 A1* | 1/2018 | Baldwin | | H04L 51/10 |
| | | | | 382/118 |
| 2018/0113587 A1* | 4/2018 | Allen | | H04L 67/18 |
| 2018/0241704 A1* | 8/2018 | Al Majid | | H04L 51/08 |
| 2018/0348970 A1* | 12/2018 | Chand | | G06F 3/167 |
| 2019/0164197 A1 | 5/2019 | Boyd et al. | | |
| 2020/0104466 A1 | 4/2020 | Denton et al. | | |

OTHER PUBLICATIONS

Garima Kakkar, Snapchat Guide for Beginners: Learn to Use Snapchat in 10 Steps, Dec. 26, 2017 (Year: 2017).*

TrackMaven, The Snapchat Marketing Guide for Brands, Feb. 2018 (Year: 2018).*

NerdsChalk Staff, Snapchat update brings group stories and custom stories based on a particular, May 24, 2017 (Year: 2017).*

"Surprise!", [Online] Retrieved from the Internet: <URL: https://www.snap.com/en-US/news/post/surprise>, (Oct. 3, 2013), 1 pg.

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next, big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

"International Application Serial No. PCT/US2021/034196, International Search Report dated Sep. 8, 2021", 3 pgs.

"International Application Serial No. PCT/US2021/034196, Written Opinion dated Sep. 8, 2021", 5 pgs.

* cited by examiner

MEDIA REQUEST SYSTEM

TECHNICAL FIELD

Embodiments of the present disclosure relate generally to mobile computing technology and, more particularly, but not by way of limitation, to systems for generating a media folder based on messages received at a client device.

BACKGROUND

Social messaging applications are platforms that enable the sharing and distribution of various forms of media content. Users of social messaging applications may send and receive messages that include multimedia to one another, wherein the multimedia may include images, videos, or other content.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
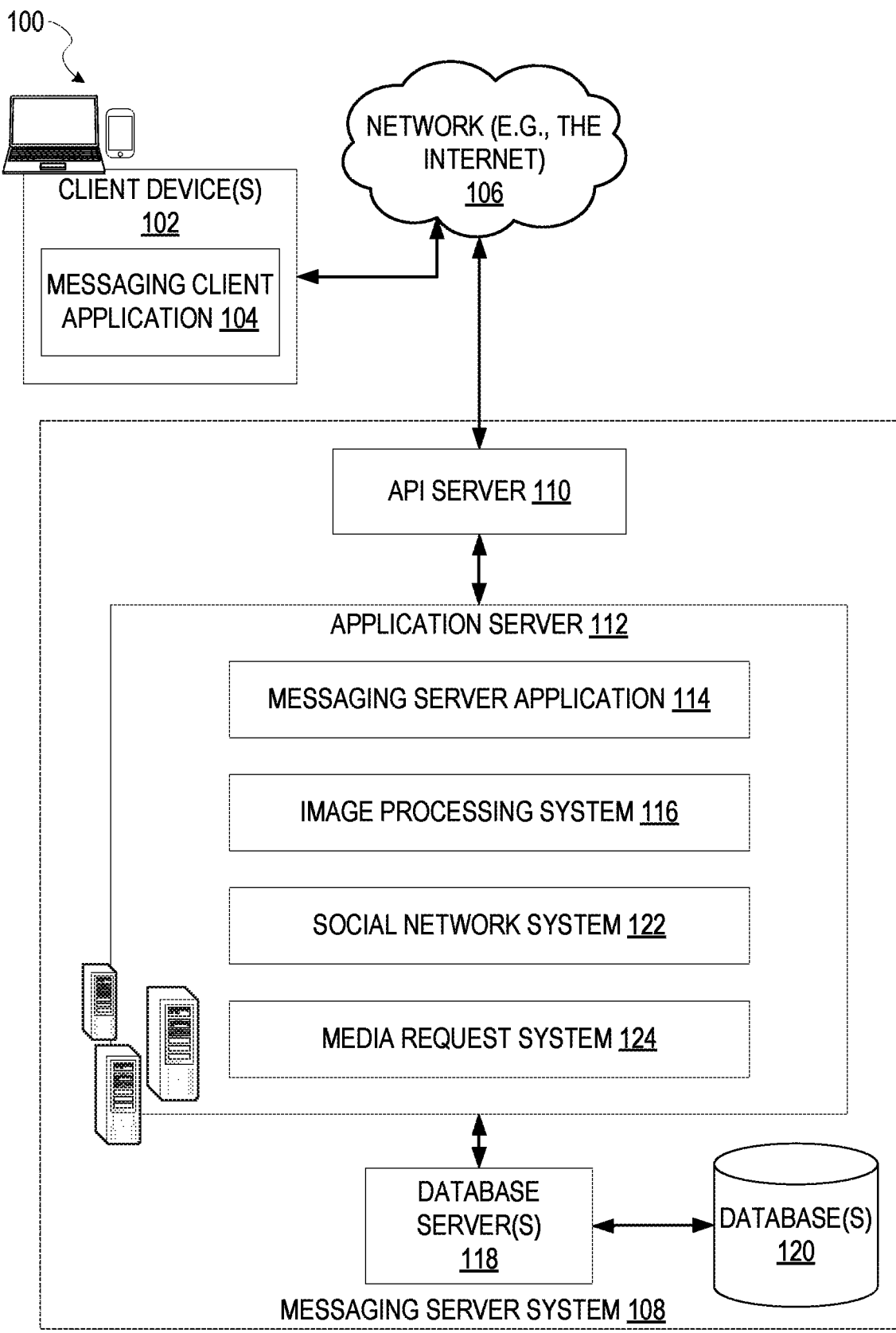
FIG. 1 is a block diagram showing an example messaging system for exchanging data (e.g., messages and associated content) over a network in accordance with some embodiments, wherein the messaging system includes a media request system.

As discussed above, social messaging applications enable users to share and distribute various forms of media content. For example, users of social messaging applications may send and receive messages that include multimedia to one another, wherein the multimedia may include images, videos, or other content. While existing messaging applications provide users with functionality to distribute media to one another via messages, users are always seeking new and different ways of sharing content with one another.

Accordingly, the disclosed system seeks to provide users with new and unique methods for interacting with one another by creating and sharing content. In certain example embodiments, a media request system is configured to perform operations that include: receiving, at a client device, a response to a request, the response comprising media content; adding the media content from the response to a collection of media content within a media folder associated with the request at the client device; causing display of a notification at the client device in response to the receiving the response to the request, the notification including an identification of the request; receiving an input that selects the notification; and causing display of a presentation of the collection of media content in response to the input that selects the notification, the presentation of the collection of media content including the media content from the response, according to certain example embodiments.

A user may generate the request for media to be distributed simultaneously to one or more users. For example, the media request system may cause display of a graphical user interface (GUI) to configure the request, wherein the GUI comprises a presentation of a set of icons that include a "request icon." According to such embodiments, by selecting the request icon, a user may generate and configure a request which may then be distributed to one or more users. In some embodiments, the request icon may include a "sticker." A sticker is an illustration, or graphical icon, which may be placed or added at a user-defined position upon media, such as a message, image, or video. In its simplest form, it may be described as an emoticon, developed to add more depth and breadth of expression than what is possible with traditional punctuation or message content. Accordingly, a user may provide an input that selects and moves the request icon to a position on media presented within a GUI at a client device in order to generate the request.

In some example embodiments, the request generated by the user may include request data that defines a set of media attributes, and wherein a response to the request may be based on the set of media attributes. For example, the request may include a selection of a media filter or lens. A recipient of the request may generate media content to be applied to a response to the request based on the selection of the media filter or lens from the request.

Responsive to receiving responses to the request, a user may select media content from the responses in order to generate and distribute composite media, wherein the composite media includes the media content from the response.

Consider an illustrative example from a user perspective. A user may access the media request system at a client device through a specially configured GUI. The media request system presents a GUI that includes a display of a set of sticker, wherein a sticker from among the set of stickers is a "request icon" which the user may move to a position within media presented within the GUI. In some embodiments, the user may additionally select a lens or media filter to be distributed with the request. The media request system may then generate and distribute the request configured by the user to a plurality of client devices, wherein the request comprises a display of media, such as an image, which includes the request icon at a position defined by the user within the image.

Recipients of the request (i.e., social network connections of the user) may provide inputs to interact with the request in order to generate a response. For example, a recipient of the request may provide an input that selects the request icon displayed within the media content. In response to receiving the input that selects the request icon, the media request system may present a GUI to generate media based on the selected lens or media filter from the request. The recipient of the request may then send back a response to the request that includes the media content generated based on the selected lens or media filter.

The media request system may present responses to the request to the user that generated the request in a common media folder at a client device of the user. The user may then navigate through the media folder to view responses to the request. In certain embodiments, the user may select the media content from the media folder in order to generate composite media based on the responses. For example, the composite media may include the media received in a request, along with new media generated by the user. The user may then share the composite media to a plurality of user connections.

FIG. 1 is a block diagram showing an example messaging system 100 for exchanging data (e.g., messages and associated content) over a network. The messaging system 100 includes one or more client device 102 which host a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and media request system 124. In certain embodiments, the media request system 124 is configured to perform operations that include: receiving, at a client device, a response to a request, the response comprising media content; adding the media content from the response to a collection of media content within a media folder associated with the request at the client device; causing display of a notification at the client device in response to the receiving the response to the request, the notification including an identification of the request; receiving an input that selects the notification; and causing display of a presentation of the collection of media content in response to the input that selects the notification, the presentation of the collection of media content including the media content from the response. Further details of the media request system 124 can be found in FIG. 3 below.

The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
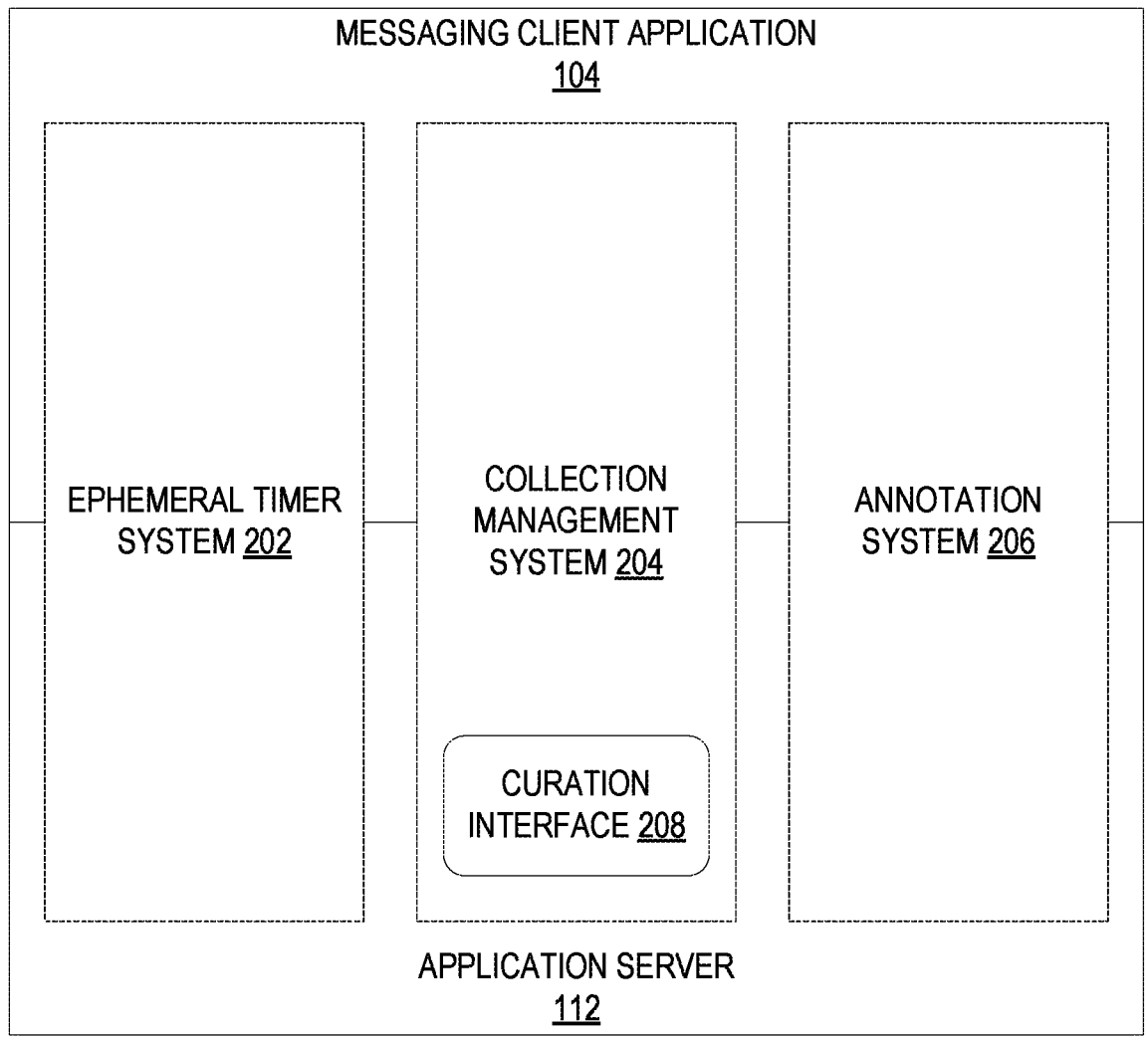
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a collection of media), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter, lens) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models. An example of a visual effect includes color overlaying. The audio and visual content or the visual effects can be applied to a media content item (e.g., a photo or video) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
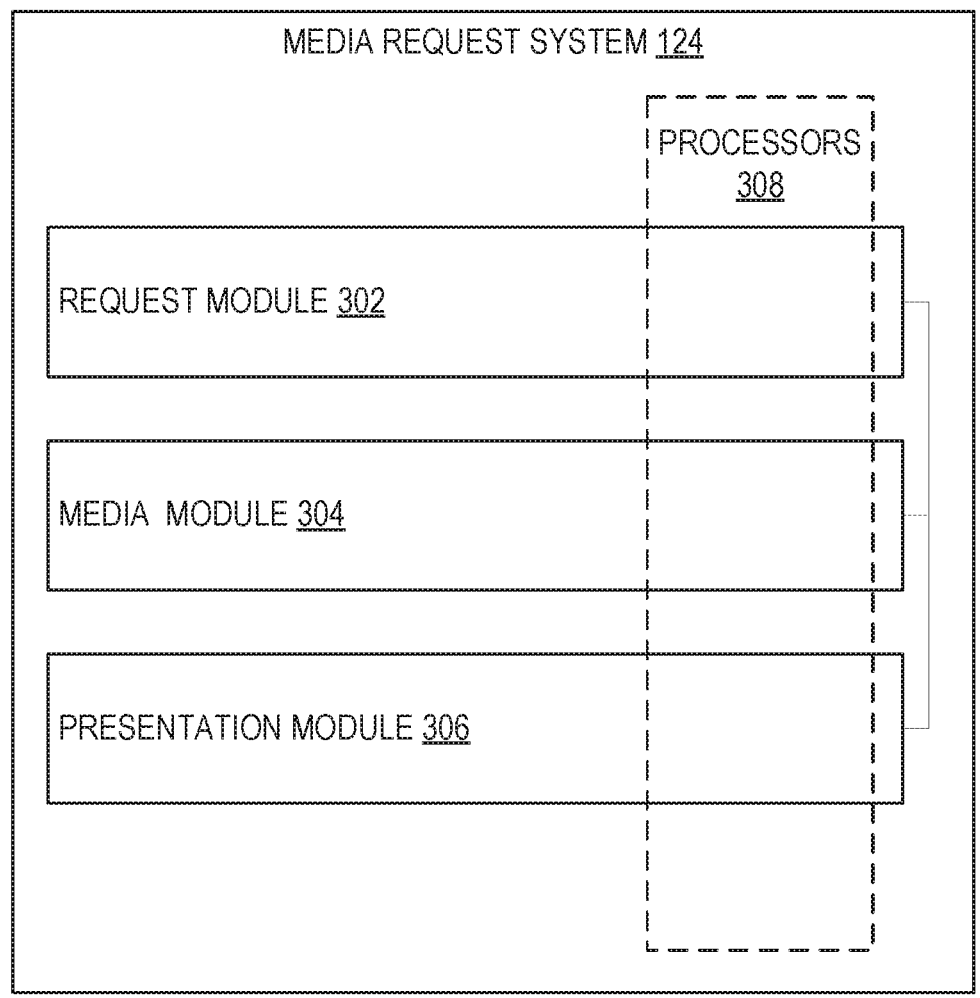
FIG. 3 is a block diagram illustrating various modules of a media request system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the media request system 124 that configure the media request system 124 to perform operations to generate media request at a client device 102, according to certain example embodiments.

The media request system 124 is shown as including a request module 302, a media module 304, and a presentation module 306, all configured to communicate with each other (e.g., via a bus, shared memory, or a switch). Any one or more of these modules may be implemented using one or more processors 308 (e.g., by configuring such one or more processors to perform functions described for that module) and hence may include one or more of the processors 308. In certain embodiments, the media request system 124 may include or have access to the database 120, wherein the database 120 may comprise a collection of media content indexed based on user attributes and astrological signs.

Any one or more of the modules described may be implemented using hardware alone (e.g., one or more of the processors 308 of a machine) or a combination of hardware and software. For example, any module described of the media request system 124 may physically include an arrangement of one or more of the processors 308 (e.g., a subset of or among the one or more processors of the machine) configured to perform the operations described herein for that module. As another example, any module of the media request system 124 may include software, hardware, or both, that configure an arrangement of one or more processors 308 (e.g., among the one or more processors of the machine) to perform the operations described herein for that module. Accordingly, different modules of the media request system 124 may include and configure different arrangements of such processors 308 or a single arrangement of such processors 308 at different points in time. Moreover, any two or more modules of the media request system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
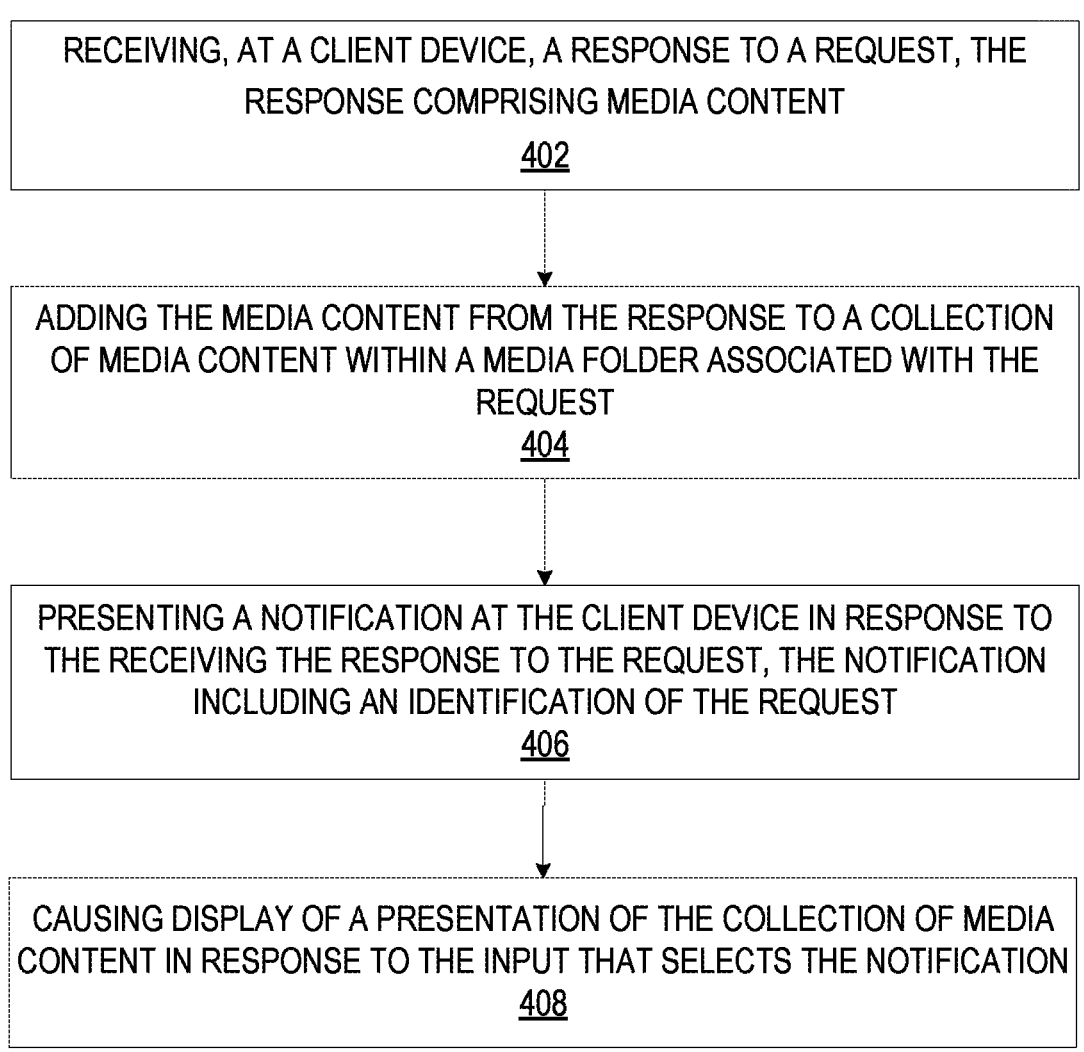
FIG. 4 is a flowchart depicting a method of receiving a response to a request for media content at a client device, according to certain example embodiments.

FIG. 4 is a flowchart depicting a method 400 for receiving a response to a request for media content at a client device 102, according to certain example embodiments. Operations of the method 400 may be performed by the modules described above with respect to FIG. 3. As shown in FIG. 4, the method 400 includes one or more operations 402, 404, 406, and 408.

At operation 402, a client device 102 receives a response to a request generated by a user of the client device 102, wherein the response includes media content. In some embodiments, a user of the client device 102 may generate a request for media content that includes a selection of one or more media elements, such as lenses or media filters, and wherein the media content of the response to the request is based on the selection of the one or more media elements of the request.

At operation 404, the media module 304 adds the media content received in the response to the request to a collection of media content within a media folder associated with the request. For example, in certain embodiments, responsive to the user generating the request at the client device 102, the media module 304 may create a folder that corresponds with the request. In some embodiments, the folder may be provisioned locally at the client device 102 or at the databases 120.

At operation 406, the presentation module 306 presents a notification at the client device 102 in response to receiving the response to the request generated by the user at the client device 102. The notification may for example include an identification of the request.

At operation 408, the presentation module 306 causes display of a presentation of the media content in response to an input that selects the notification at the client device 102. In some embodiments, responsive to receiving an input that selects the notification, the presentation module 306 may access the media folder associated with the request to cause display of a presentation of the collection of media content from the media folder.

Figure 5:
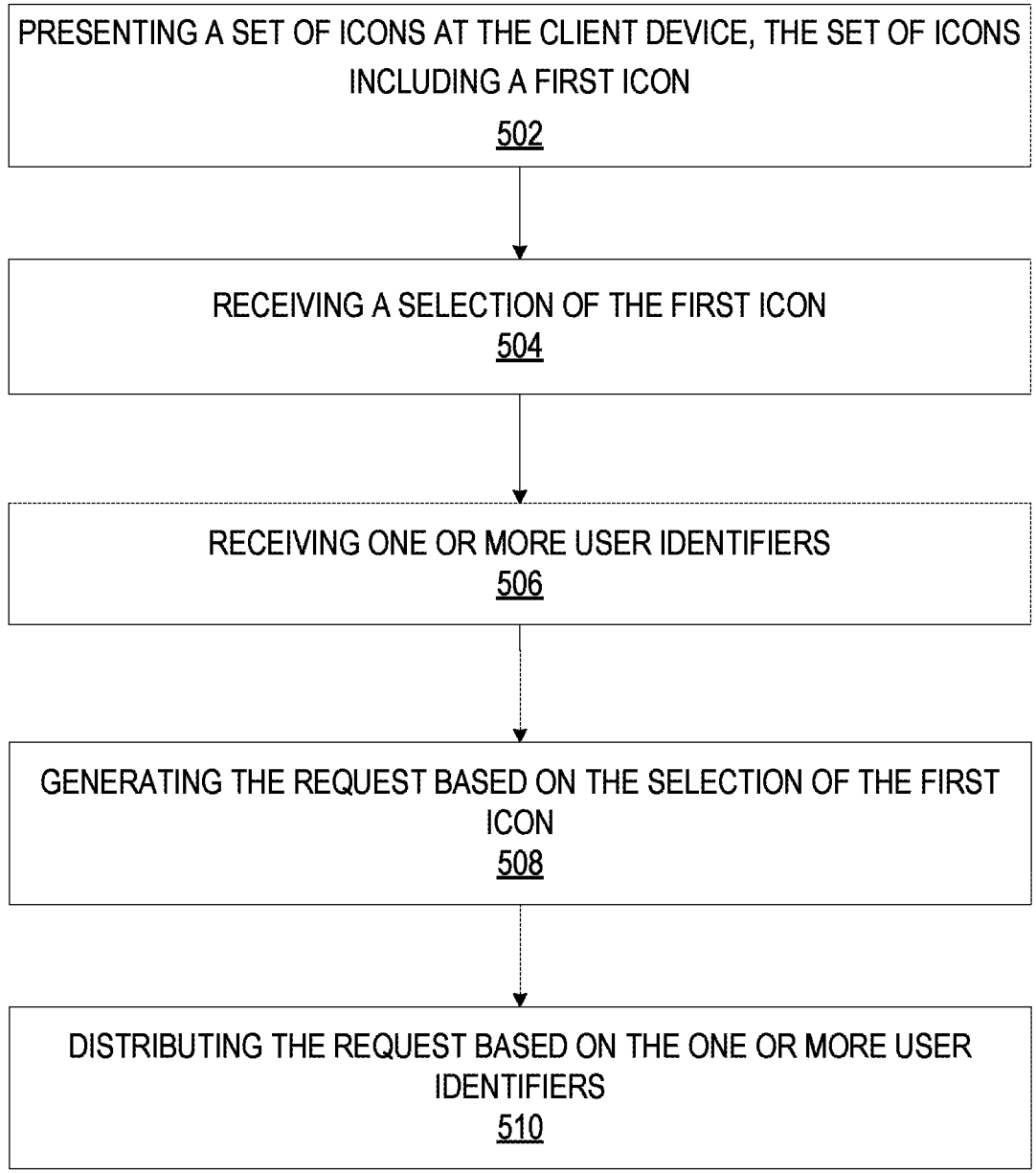
FIG. 5 is a flowchart depicting a method of generating a request for media content at a client device, according to certain example embodiments.

FIG. 5 is a flowchart depicting a method 500 of generating a request for media content at a client device 102, according to certain example embodiments. Operations of the method 500 may be performed by the modules described above with respect to FIG. 3. As shown in FIG. 5, the method 500 includes one or more operations 502, 504, 506, 508 and 510, that may be performed as a part (i.e., a subroutine) of operation 402 of the method 400.

At operation 502, the presentation module 306 causes display of a GUI that includes a set of icons. For example, as seen in the interface flow diagram 700 of FIG. 7, the presentation module 306 may generate and cause display of a GUI, such as the GUI 705, to configure media content to be distributed in a message from the user to a plurality of recipients. The set of icons presented within the GUI 705 may therefore include stickers that the user of the client device 102 may select and position within media content displayed within the GUI 705 (i.e., the image 715).

At operation 504, the media module 304 receives an input that selects a first icon from among the set of icons presented within the GUI generated by the presentation module 306 (i.e., the GUI 705), wherein the first icon includes a "request icon." According to certain embodiments, inclusion of the request icon in a message may cause the media request system 124 to perform operations discussed in the method 400 that include generating a media folder that corresponds with the request.

At operation 506, the request module 302 receives one or more user identifiers. For example, a user of the client device 102 may provide an input that selects the one or more user identifiers from among a list of user identifiers (i.e., a list of user connections), or in some embodiments, the user of the client device 102 may provide an input that selects or otherwise specifies a user distribution group, wherein the user distribution group comprises a list of the one or more user identifiers.

At operation 508, the request module 302 generates a request based on the inputs received from the user of the client device 102, including the selection of the request icon, the one or more user identifiers, and media content presented within the GUI 705. For example, as seen in the interface flow diagram 700 of FIG. 7, the request generated based on the user inputs may include the request 720. According to certain embodiments, at operation 510, the media request system 124 may distribute the request 720 based on the one or more user identifiers selected by the user.

Figure 6:
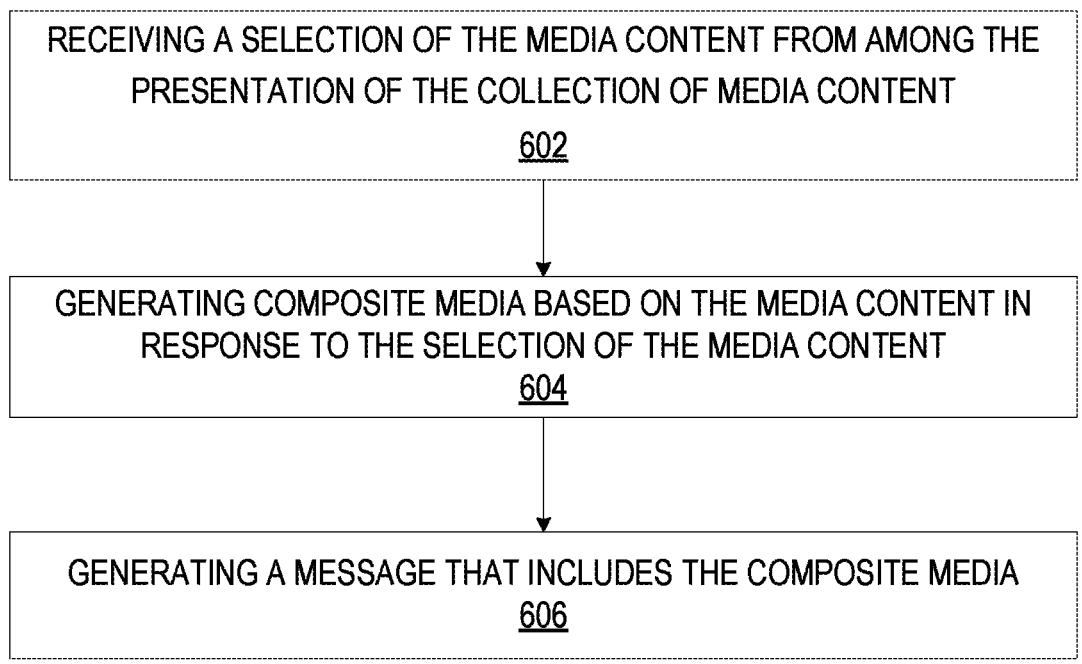
FIG. 6 is a flowchart depicting a method of generating composite media based on a response to a request, according to certain example embodiments.

FIG. 6 is a flowchart depicting a method 600 of generating composite media based on a response to a request, according to certain example embodiments. Operations of the method 600 may be performed by the modules described above with respect to FIG. 3. As shown in FIG. 6, the method 600 includes one or more operations 602, 604, and 606.

Figure 9:
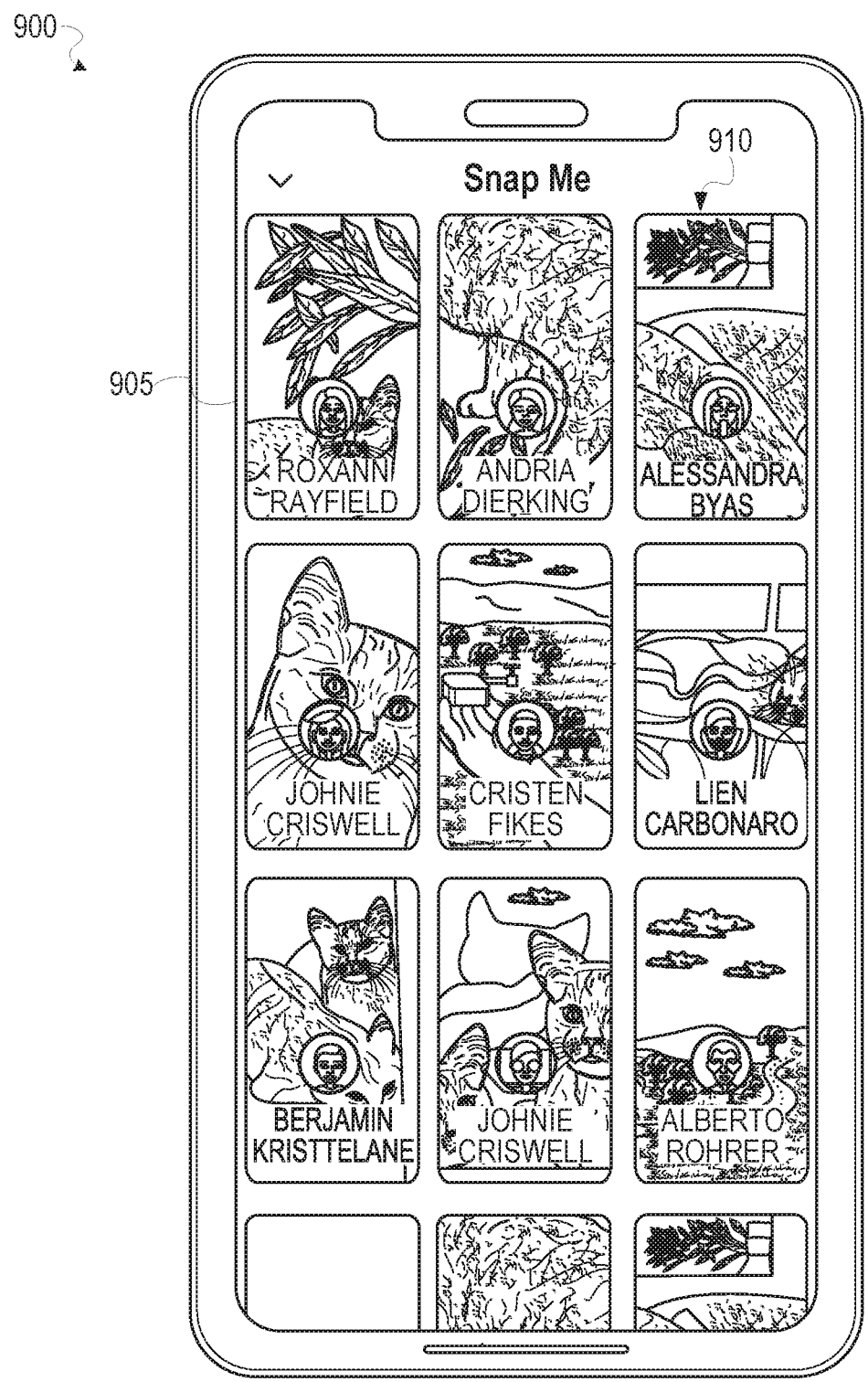
FIG. 9 is an interface diagram depicting a graphical user interface to display a collection of media content, according to certain example embodiments.

According to certain embodiments, a user of the media request system 124 may share the media received in responses to the requests. For example, the user may add the media to a story, or media collection, associated with a corresponding user profile. Accordingly, in such embodiments, at operation 602, the media module 304 receives a selection of the media content received in a response to a request from among a presentation of a collection of media content within a media folder associated with the request. The interface diagram 900 of FIG. 9 illustrates an exemplary media folder 905 that corresponds with a request generated by the user of the media request system 124.

For example, the user of the media request system 124 may provide an input to display the media collection of the media folder 905, and in response, the presentation module 306 accesses the media collection of the media folder 905, and causes display of a presentation of the media collection, as seen in the interface diagram 900.

Figure 10:
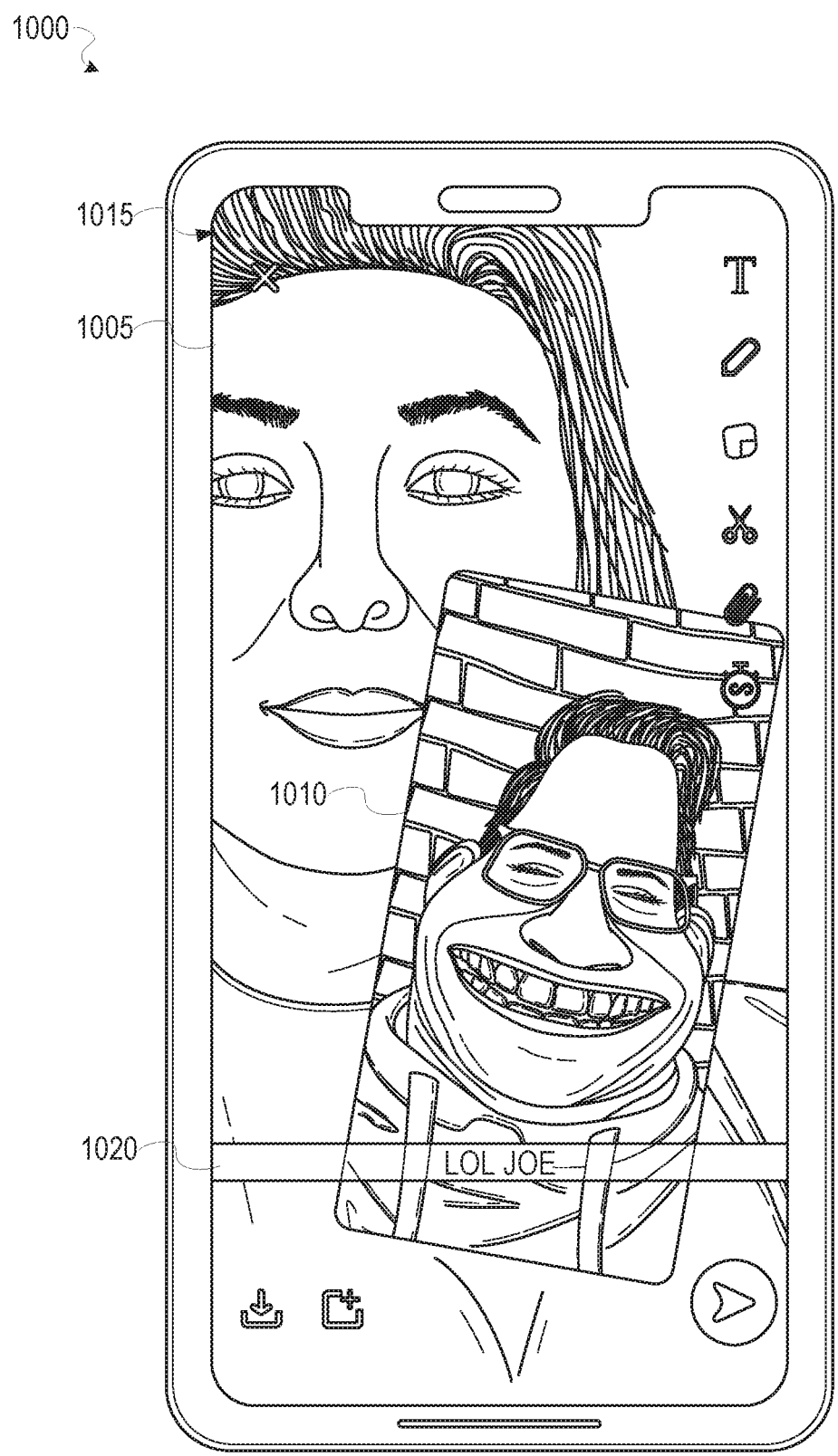
FIG. 10 is an interface diagram depicting composite media generated by a media request system, according to certain example embodiments.

At operation 604, responsive to receiving the selection of the media content from among the presentation of the collection of media content of the media folder, the media module 304 generates composite media based on the selected media content. In some embodiments, the user of the media request system 124 may provide one or more inputs to configure the composite media content. For example, as seen in FIG. 10, the composite media content 1005 may comprise a display of the selected media content 1010 at a position within an image 1015 generated or selected by the user of the media request system 124. The user of the media request system 124 may apply text or other graphics to the composite media, such as the text 1020.

At operation 606, the media module 304 generates a message that includes the composite media. The user of the media request system may distribute the composite media to one or more users by providing an input that selects or otherwise identifies the one or more users, or a distribution group that includes the one or more users. In further embodiments, the user of the media request system 124 may send the message to a story, or media collection associated with a corresponding user profile, such that social network connections of the user may access and view the composite media by accessing the user profile.

Figure 7:
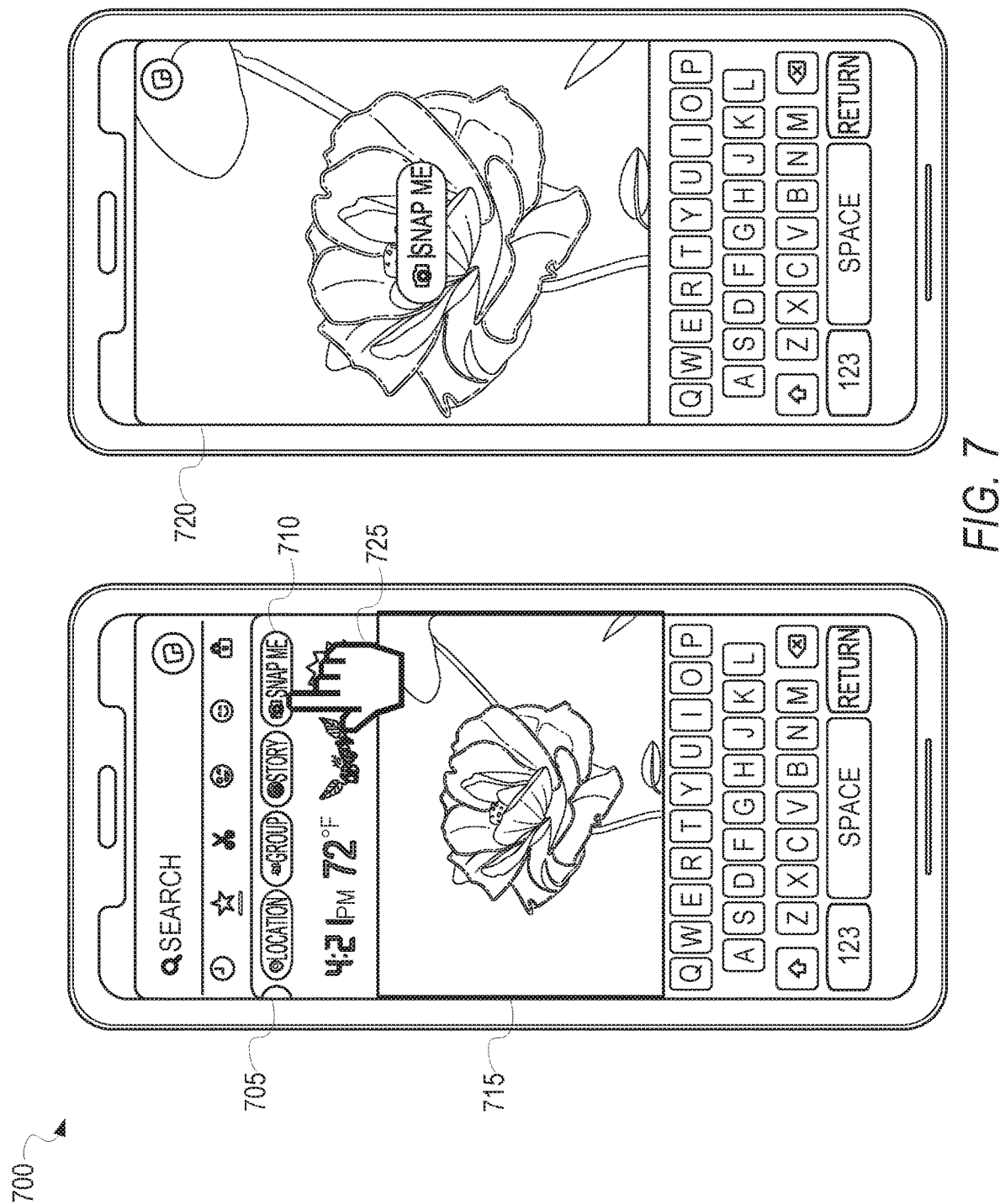
FIG. 7 is an interface flow-diagram depicting interfaces presented by a media request system, according to certain example embodiments.

FIG. 7 is an interface flow diagram 700 depicting interfaces presented by the media request system 124 to generate a media request, according to certain example embodiments. A request for media content may be generated by a user of the media request system 124 via the GUI 705.

As seen in the GUI 705, an icon 710 (i.e., a media request icon) may be presented among a set of graphical icons within the GUI 705, along with media, such as the image 715. A user of the media request system may provide an input 725 that selects the icon 710 and moves the icon 710 to a position within the image 715. As seen in the flow diagram 700, the media request system 124 may generate the request 720 based on inputs received from the user of the media request system 124, via the GUI 705. The request 720 may be distributed to one or more users.

Figure 8:
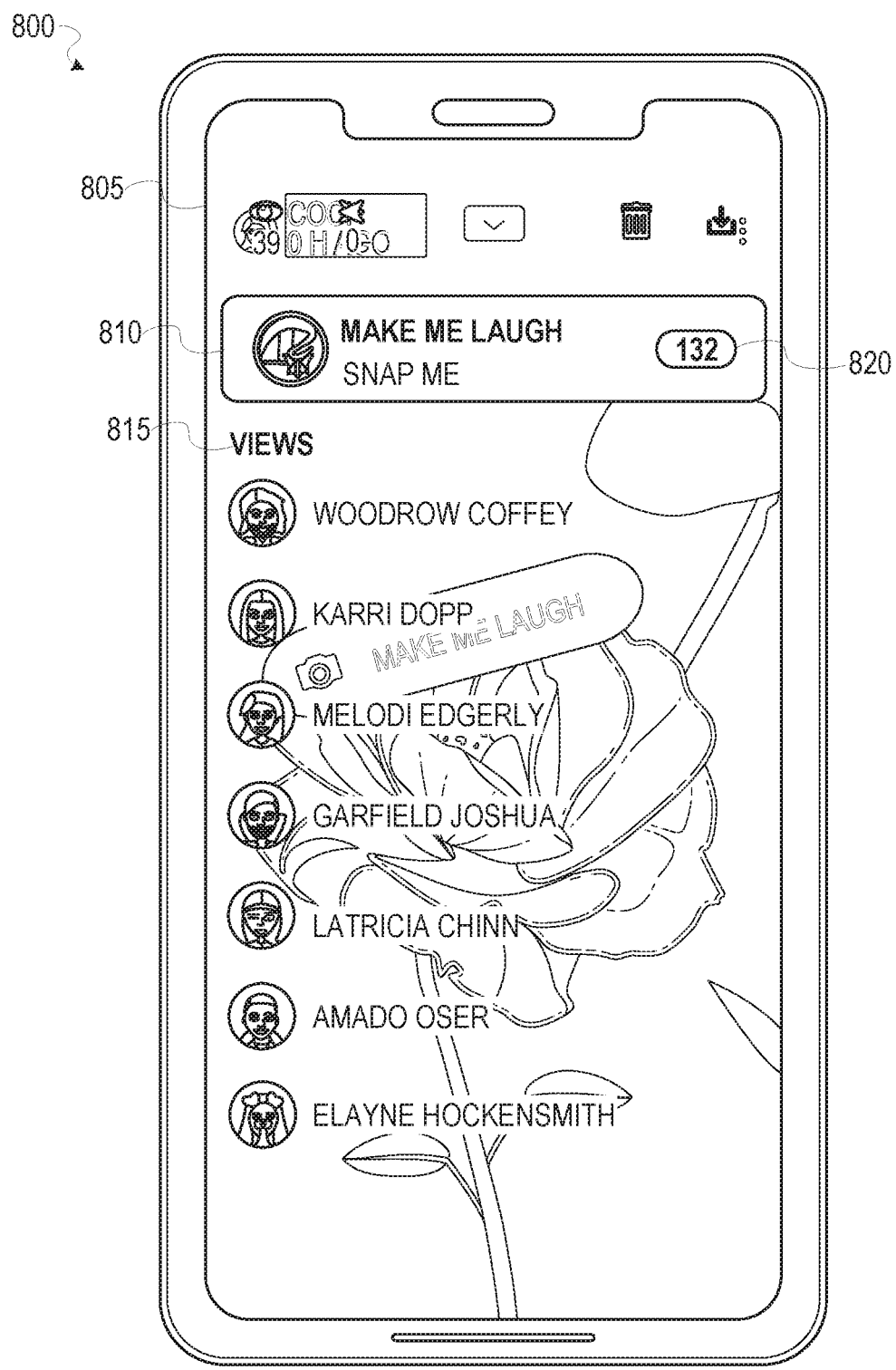
FIG. 8 is an interface diagram depicting a graphical user interface to access a media folder, according to certain example embodiments.

FIG. 8 is an interface diagram 800 depicting a GUI 805 to access a media folder 810, according to certain example embodiments. As seen in the diagram 800, the GUI 805 may include a display of a list 815 of users that received or otherwise accessed the request generated by the user, as well as an indication 820 of a number of responses to the request which were received.

FIG. 9 is an interface diagram 900 depicting a GUI 905 to display a collection of media content 910, according to certain example embodiments. As discussed above, the collection of media content 910 may be associated with a media folder, such as the media folder 810 depicted in FIG. 8. A user of the media request system 124 may provide an input to select media content from among the collection of media content 910 in order to generate composite media, as depicted in FIG. 10.

FIG. 10 is an interface diagram 1000 depicting composite media 1005 generated by the media request system 124, according to certain example embodiments. As seen in the interface diagram 1000, the composite media 1005 may comprise media content 1010, an image 1015, and text 1020.

For example, according to certain example embodiments, a user of the media request system 124 may provide an input that selects a display of the media content 1010 from among a collection of media content associated with a request, such as the collection of media content 905 of the interface diagram 900 depicted in FIG. 9. The media request system 124 may provide the user with one or more interfaces to generate the composite media 1005, by providing inputs to select the image 1015, and to define the text 1020. Accordingly, the composite media 1005 may be distributed to a plurality of users via a message generated by the media request system 124, or by adding the composite media 1005 to a story associated with a user profile of the user.

Software Architecture

Figure 11:
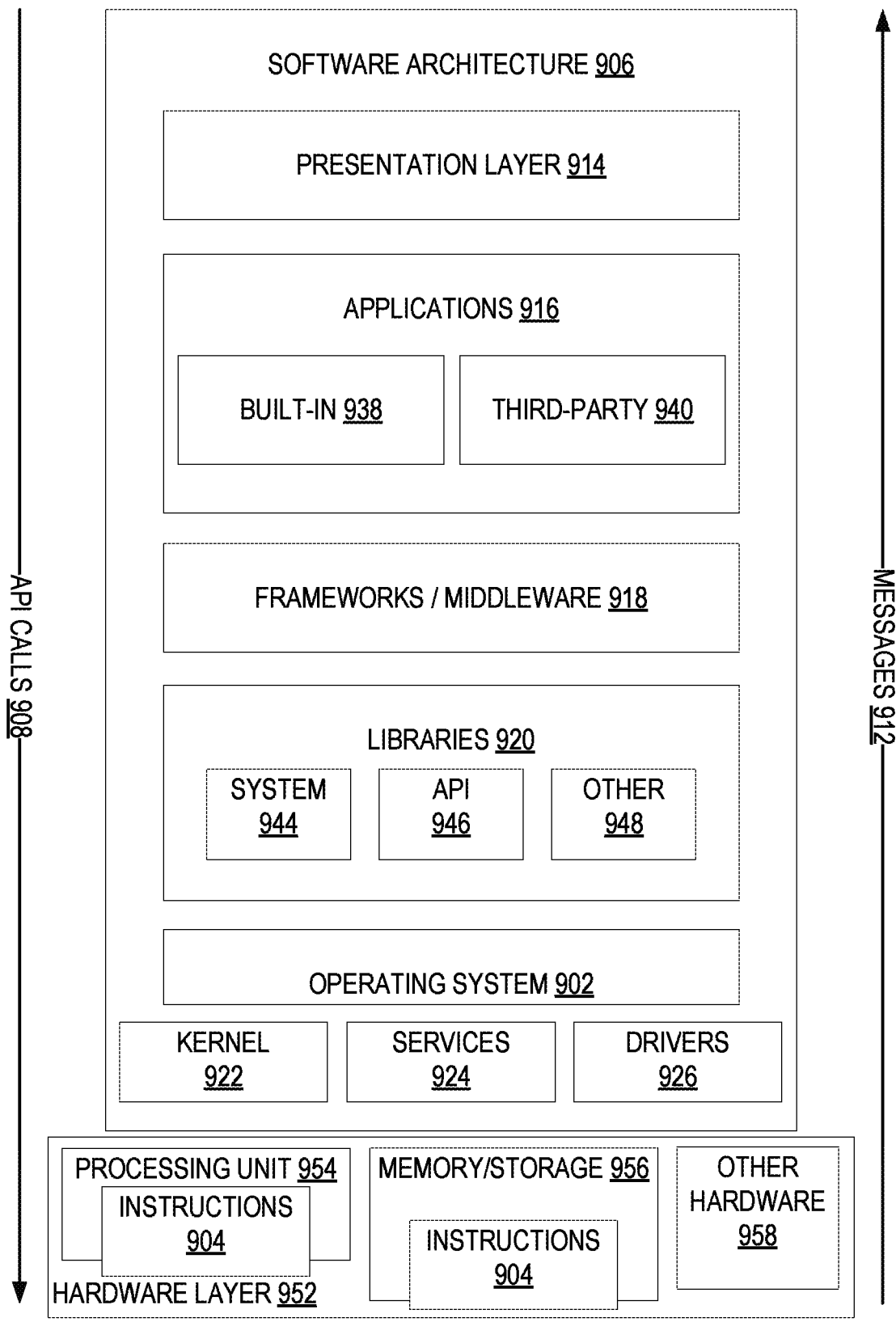
FIG. 11 is a block diagram illustrating a representative software architecture, which may be used in conjunction with various hardware architectures herein described and used to implement various embodiments.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1206 may execute on hardware such as machine 1200 of FIG. 12 that includes, among other things, processors 1204, memory 1214, and I/O components 1218. A representative hardware layer 1152 is illustrated and can represent, for example, the machine 1100 of FIG. 11. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke application programming interface (API) API calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user.

Figure 12:
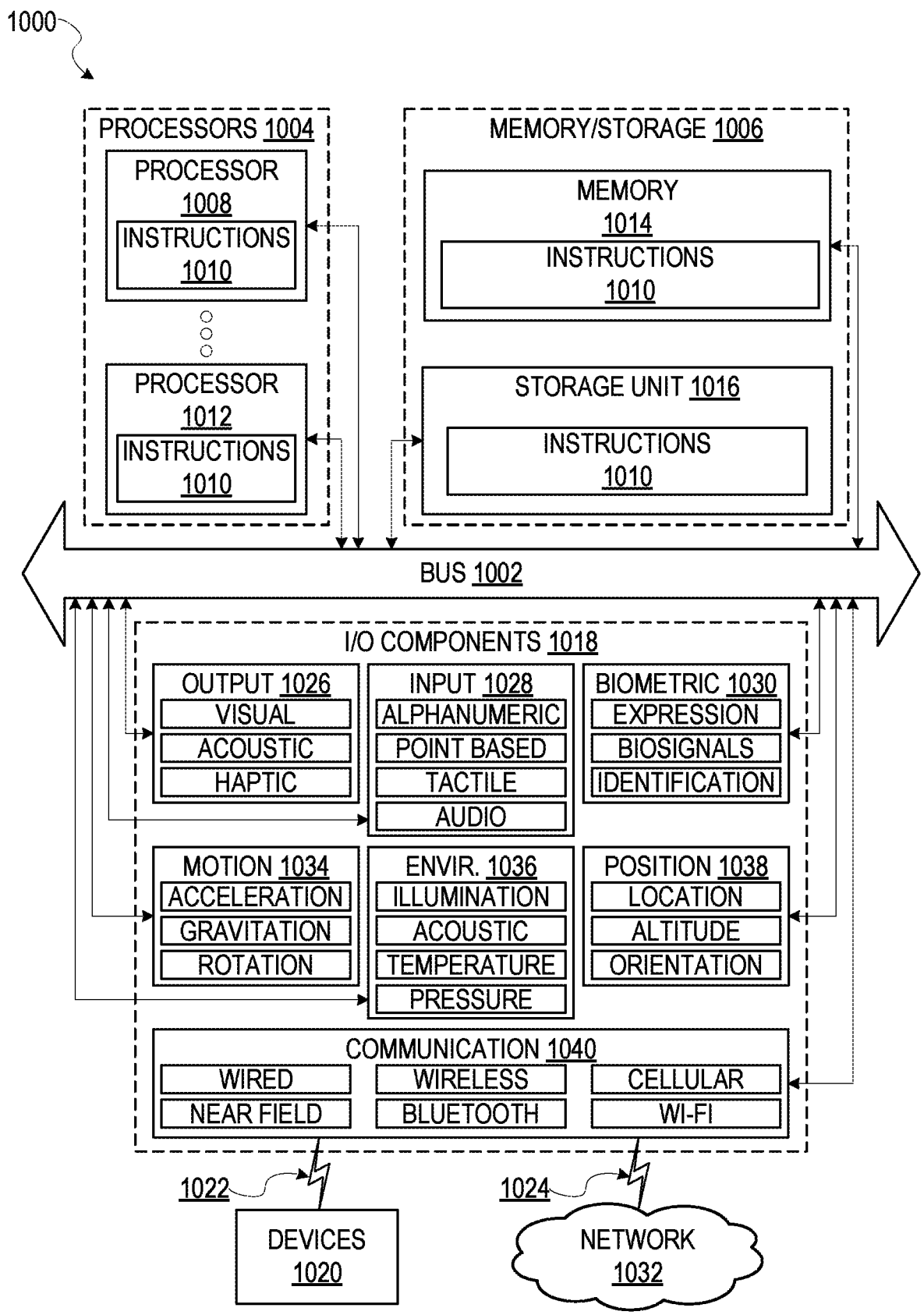
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental environment components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:
   presenting a graphical user interface (GUI) that comprises a display of a media item and a set of icons at a client device associated with a user account, the set of icons including a first icon;
   receiving an input that drags the first icon to a position upon the media item;
   receiving one or more user identifiers;
   generating, at a client device, a request to one or more users identified by the one or more user identifiers based on the input that drags the first icon to the position upon the media item, the request comprising a text input field and a display of a selection of one or more media elements to be included in a response to the request;
   provisioning, at the client device, a folder among a collection of media content associated with the user account based on the generating the request;
   receiving, at the client device, the response to the request, the response comprising a text string entered into the text input field, and media content that includes at least the one or more media elements identified by the request;
   adding the media content and the text string from the response to the media folder associated with the request among the collection of media content;
   causing display of a notification at the client device in response to the receiving the response to the request, the notification including an identification of the request;
   receiving an input that selects the notification; and
   causing display of a presentation of the collection of media content in response to the input that selects the notification, the presentation of the collection of media content including the media content from the response.

2. The method of claim 1, wherein the response to the request includes a user identifier, and the presentation of the collection of media content includes a display of the user identifier.

3. The method of claim 2, wherein the user identifier includes a graphical avatar.

4. The method of claim 1, wherein the request includes corresponding image, and the causing display of the presentation of the collection of media content includes:
   overlaying the presentation of the collection of media content upon a display of the image from the request.

5. The method of claim 1, wherein the request includes request data that defines a set of media attributes, and wherein the media content of the response is based on the set of media attributes of the request.

6. The method of claim 1, wherein the method further comprises:
   receiving an input that selects the media content from the response from among the presentation of the collection of media content; and
   generating composite media content based on the media content in response to the selection of the media content.

7. The method of claim 6, wherein the method further comprises:
   generating one or more messages that include the composite media content.

8. A system comprising:
   a memory; and
   at least one hardware processor coupled to the memory and comprising instructions that causes the system to perform operations comprising:
   presenting a graphical user interface (GUI) that comprises a display of a media item and a set of icons at a client device associated with a user account, the set of icons including a first icon;
   receiving an input that drags the first icon to a position upon the media item;
   receiving one or more user identifiers;

generating, at a client device, a request to one or more users identified by the one or more user identifiers based on the input that drags the first icon to the position upon the media item, the request comprising a text input field and a display of a selection of one or more media elements to be included in a response to the request;

provisioning, at the client device, a folder among a collection of media content associated with the user account based on the generating the request;

receiving, at the client device, the response to the request, the response comprising a text string entered into the text input field, and media content that includes at least the one or more media elements identified by the request;

adding the media content and the text string from the response to the media folder associated with the request among the collection of media content;

causing display of a notification at the client device in response to the receiving the response to the request, the notification including an identification of the request;

receiving an input that selects the notification; and causing display of a presentation of the collection of media content in response to the input that selects the notification, the presentation of the collection of media content including the media content from the response.

9. The system of claim 8, wherein the response to the request includes a user identifier, and the presentation of the collection of media content includes a display of the user identifier.

10. The system of claim 9, wherein the user identifier includes a graphical avatar.

11. The system of claim 1, wherein the request includes corresponding image, and the causing display of the presentation of the collection of media content includes:

overlaying the presentation of the collection of media content upon a display of the image from the request.

12. The system of claim 8, wherein the request includes request data that defines a set of media attributes, and wherein the media content of the response is based on the set of media attributes of the request.

13. The system of claim 8, wherein the operations further comprise:

receiving an input that selects the media content from the response from among the presentation of the collection of media content; and generating composite media content based on the media content in response to the selection of the media content.

14. A non-transitory machine-readable storage medium comprising instructions that, when executed by one or more processors of a machine, cause the machine to perform operations comprising:

presenting a graphical user interface (GUI) that comprises a display of a media item and a set of icons at a client device associated with a user account, the set of icons including a first icon;

receiving an input that drags the first icon to a position upon the media item;

receiving one or more user identifiers;

generating, at a client device, a request to one or more users identified by the one or more user identifiers based on the input that drags the first icon to the position upon the media item, the request comprising a text input field and a display of a selection of one or more media elements to be included in a response to the request;

provisioning, at the client device, a folder among a collection of media content associated with the user account based on the generating the request;

receiving, at the client device, the response to the request, the response comprising a text string entered into the text input field, and media content that includes at least the one or more media elements identified by the request;

adding the media content and the text string from the response to the media folder associated with the request among the collection of media content;

causing display of a notification at the client device in response to the receiving the response to the request, the notification including an identification of the request;

receiving an input that selects the notification; and causing display of a presentation of the collection of media content in response to the input that selects the notification, the presentation of the collection of media content including the media content from the response.

* * * * *